(12) United States Patent
Park et al.

(10) Patent No.: US 11,598,994 B2
(45) Date of Patent: *Mar. 7, 2023

(54) DISPLAY DEVICE

(71) Applicant: Samsung Display Co. Ltd., Yongin-si (KR)

(72) Inventors: Sae Ron Park, Gimhae-si (KR); Jung Hyun Ahn, Daejeon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,706

(22) Filed: Mar. 7, 2022

(65) Prior Publication Data

US 2022/0187648 A1 Jun. 16, 2022

Related U.S. Application Data

(63) Continuation of application No. 17/140,624, filed on Jan. 4, 2021, now Pat. No. 11,269,223, which is a
(Continued)

(30) Foreign Application Priority Data

Jun. 11, 2018 (KR) .................. 10-2018-0066779

(51) Int. Cl.
*G02F 1/1339* (2006.01)
*G02F 1/1362* (2006.01)
(Continued)

(52) U.S. Cl.
CPC ........ *G02F 1/13394* (2013.01); *G02F 1/1337* (2013.01); *G02F 1/1368* (2013.01);
(Continued)

(58) Field of Classification Search
CPC ............. G02F 1/136209; G02F 1/1368; G02F 1/1337; G02F 1/13398; G02F 2201/123;
(Continued)

(56) References Cited

U.S. PATENT DOCUMENTS 7,633,595 B2  12/2009 Kim et al.
10,591,781 B2  3/2020 Park et al.
(Continued)

FOREIGN PATENT DOCUMENTS

KR  10-1016740  2/2011
KR  10-1270940  6/2013
(Continued)

OTHER PUBLICATIONS

Non-Final Office Action dated Aug. 12, 2019, in U.S. Appl. No. 16/214,134.
(Continued)

*Primary Examiner* — James A Dudek
(74) *Attorney, Agent, or Firm* — H.C. Park & Associates, PLC

(57) ABSTRACT

A display device including a first display substrate including a switching element disposed on a first base, a height difference generation pattern disposed on the switching element to overlap with the switching element, a color filter layer disposed on the height difference generation pattern and covering the height difference generation pattern, an organic layer disposed on the color filter layer and including a protruding part overlapping the height difference generation pattern, and a pixel electrode disposed on the organic layer, electrically connected to the switching element, and not overlapping the protruding part; a second display substrate including a second base facing the first base; a liquid crystal layer disposed between the first and second display substrates; and a column spacer disposed between a first
(Continued)

surface of the second base facing the first base and the organic layer and overlapping the protruding part.

11 Claims, 14 Drawing Sheets

Related U.S. Application Data continuation of application No. 16/781,898, filed on Feb. 4, 2020, now Pat. No. 10,884,295, which is a continuation of application No. 16/214,134, filed on Dec. 10, 2018, now Pat. No. 10,591,781.

(51) Int. Cl.
  *G02F 1/1368* (2006.01)
  *G02F 1/1337* (2006.01)
(52) U.S. Cl.
  CPC .... *G02F 1/136209* (2013.01); *G02F 1/13398* (2021.01); *G02F 1/136222* (2021.01); *G02F 2201/123* (2013.01); *G02F 2202/02* (2013.01)
(58) Field of Classification Search
  CPC .............. G02F 2202/02; G02F 1/13394; G02F 1/136222
  See application file for complete search history.

(56) References Cited

U.S. PATENT DOCUMENTS

| 10,884,295 | B2 | 1/2021 | Park et al. |
| 11,269,223 | B2* | 3/2022 | Park ................. G02F 1/136209 |
| 2005/0140892 | A1 | 6/2005 | Kim et al. |

FOREIGN PATENT DOCUMENTS

| KR | 10-1490473 | 2/2015 |
| KR | 10-2018-0027701 | 3/2018 |
| KR | 10-1835545 | 3/2018 |

OTHER PUBLICATIONS

Notice of Allowance dated Nov. 14, 2019, in U.S. Appl. No. 16/214,134.
Non-Final Office Action dated May 15, 2020, in U.S. Appl. No. 16/781,898.
Notice of Allowance dated Sep. 2, 2020, in U.S. Appl. No. 16/781,898.
Non-Final Office Action dated Jul. 8, 2021, in U.S. Appl. No. 17/140,624.
Notice of Allowance dated Oct. 28, 2021, in U.S. Appl. No. 17/140,624.

* cited by examiner

DISPLAY DEVICE

CROSS REFERENCE TO RELATED APPLICATION

This application is a Continuation of U.S. patent application Ser. No. 17/140,624, filed on Jan. 4, 2021, which is a Continuation of U.S. patent application Ser. No. 16/781,898, filed on Feb. 4, 2020, which is a Continuation of U.S. patent application Ser. No. 16/214,134, filed on Dec. 10, 2018, now issued as U.S. Pat. No. 10,591,781, each of which claims priority from and the benefit of Korean Patent Application No. 10-2018-0066779, filed on Jun. 11, 2018, which are hereby incorporated by reference for all purposes as if fully set forth herein.

BACKGROUND

Field

Exemplary embodiments of the invention relate generally to a display device.

Discussion of the Background

Liquid crystal display (LCD) devices have been used in various devices such as a television (TV), a monitor, a notebook computer, a mobile phone, a personal digital assistant (PDA), and a smartphone. A typical LCD device has a liquid crystal layer interposed between lower and upper substrates and displays an image by controlling the alignment angle of liquid crystal molecules in the liquid crystal layer so as to control the transmittance of the liquid crystal layer. Column spacers are disposed between the upper and lower substrates and can thereby uniformly maintain the cell gap between the lower and upper substrates.

When an external force is applied, the column spacers may be moved sideways, and as a result, one of the lower and upper substrates may be damaged. If such damage occurs at the boundary between pixels, light leakage may occur.

The above information disclosed in this Background section is only for understanding of the background of the inventive concepts, and, therefore, it may contain information that does not constitute prior art.

SUMMARY

Exemplary embodiments of the present invention provide a display device capable of uniformly maintaining the cell gap between two substrates and preventing the two substrates from being damaged by an external force.

Additional features of the inventive concepts will be set forth in the description which follows, and in part will be apparent from the description, or may be learned by practice of the inventive concepts.

According to an exemplary embodiment of the present invention, a display device includes a first display substrate including a first base, a switching element disposed on the first base, a height difference generation pattern, which has an island shape and is disposed on the switching element to overlap with the switching element, a color filter layer, which is disposed on the height difference generation pattern and covers the height difference generation pattern, an organic layer, which is disposed on the color filter layer and includes a protruding part overlapping with the height difference generation pattern, and a pixel electrode, which is disposed on the organic layer, is electrically connected to the switching element, and does not overlap with the protruding part; a second display substrate including a second base facing the first base; a liquid crystal layer disposed between the first and second display substrates; and a column spacer disposed between a first surface of the second base facing the first base and the organic layer and overlapping with the protruding part.

The height difference generation pattern may contain a first pigment of a first color, and the color filter layer may contain a second pigment of a second color different from the first color.

The first color may be one of red or green, and the second color may be blue.

The switching element may include a semiconductor layer having a channel region, and the height difference generation pattern may cover the channel region.

The column spacer may be fixedly disposed on the second base.

An end of the column spacer may face the protruding part.

The first display substrate may include a first alignment film, which is disposed on the organic layer, and the second display substrate may include a second alignment film, which is disposed on the second base and covers the column spacer.

A part of the first alignment film disposed on the protruding part and a part of the second alignment film disposed on the column spacer may be in direct contact with each other.

A maximum width of the height difference generation pattern may be 30 μm to 45 μm.

A height of the protruding part may be 0.6 μm to 0.8 μm.

The display device may further comprise a light-blocking member disposed on the first surface of the second base.

The light-blocking member may overlap with the switching element and the height difference generation pattern.

The column spacer may be formed of the same material as the light-blocking member.

According to another exemplary embodiment of the present invention, a display device includes a first display substrate including a first base, which has first and second pixel areas, first and second switching elements, which are disposed on the first base and are located in the first and second pixel areas, respectively, a height difference generation pattern, which has an island shape and is disposed on the first switching element to overlap with the first switching element, a first color filter layer, which is disposed on the first switching element and the height difference generation pattern and covers the height difference generation pattern, a second color filter layer, which is disposed on the second switching element, an organic layer, which covers the first and second color filter layers and includes a first protruding part overlapping with the height difference generation pattern, a first pixel electrode, which is disposed on the organic layer in the first pixel area, is electrically connected to the first switching element, and does not overlap with the first protruding part, and a second pixel electrode, which is disposed on the organic layer in the second pixel area, is electrically connected to the second switching element, and does not overlap with the second switching element; a second display substrate including a second base, which faces the first base; a liquid crystal layer disposed between the first and second display substrates; and a first column spacer disposed between a first surface of the second base facing the first base and the organic layer and overlapping with the first protruding part.

The display device may further include a second column spacer disposed between the first surface of the second base and the organic layer and overlapping with the second switching element.

The organic layer may further include a second protruding part overlapping with the second switching element and having a smaller height than the first protruding part.

The height of the first protruding part may be greater than the height of the second protruding part by 0.3 µm to 0.5 µm.

The first and second column spacers may have the same height.

The first display substrate may include a first alignment film, which is disposed on the organic layer.

The second display substrate may include a second alignment film, which is disposed on the second base and covers the first and second column spacers.

A part of the first alignment film disposed on the first protruding part and a part of the second alignment film disposed on the first column spacer may be in direct contact with each other.

The first and second column spacers may be fixedly disposed on the second base.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
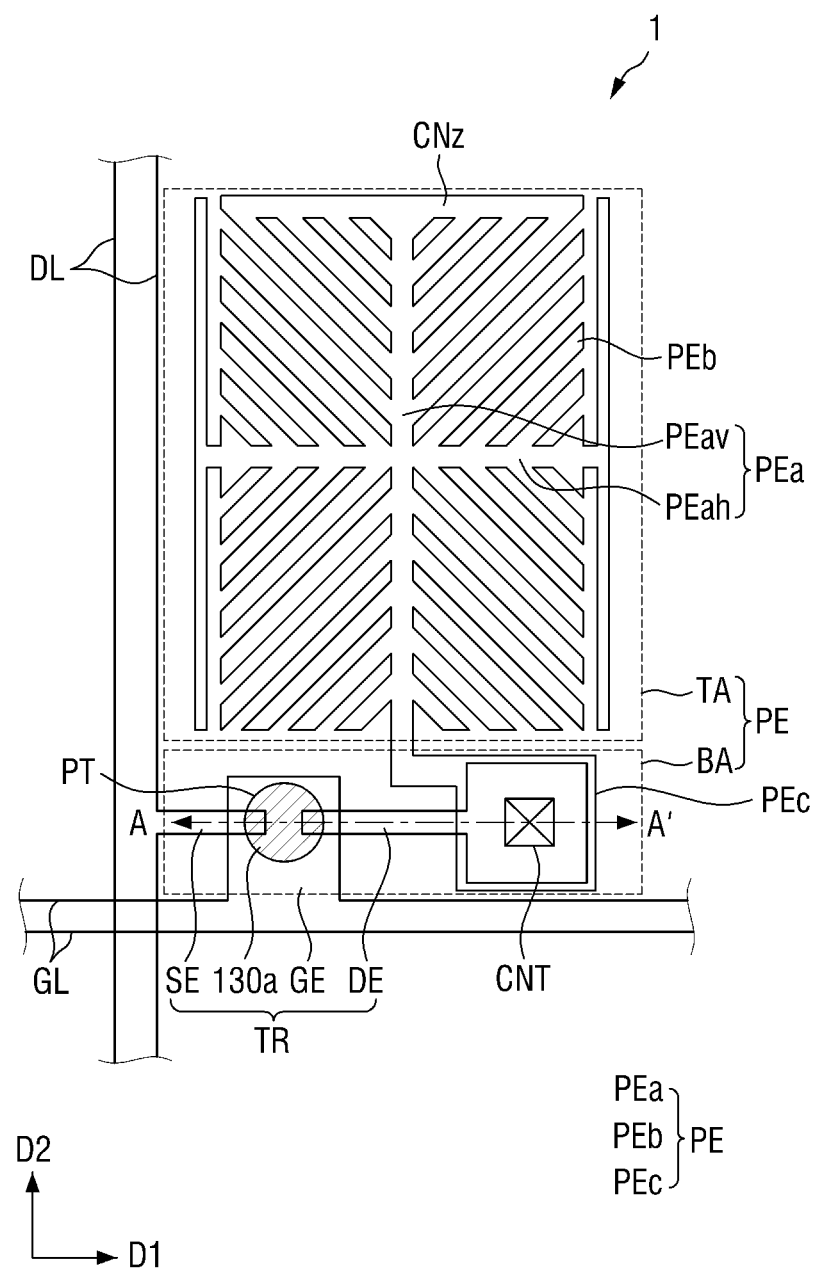
FIG. 1 is a layout view of a pixel of a display device according to an exemplary embodiment of the present invention.

In the following description, for the purposes of explanation, numerous specific details are set forth in order to provide a thorough understanding of various exemplary embodiments of the invention. As used herein "embodiments" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2A:
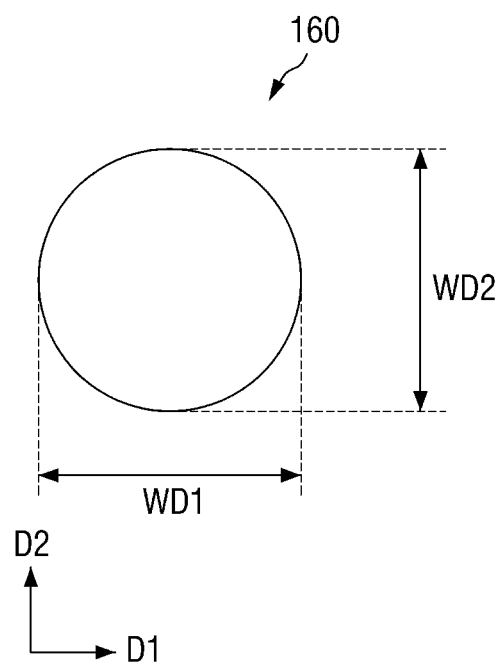
FIG. 2A, FIG. 2B, FIG. 3A, and FIG. 3B are plan views illustrating examples of a protruding part of FIG. 1.
Figure 2B:
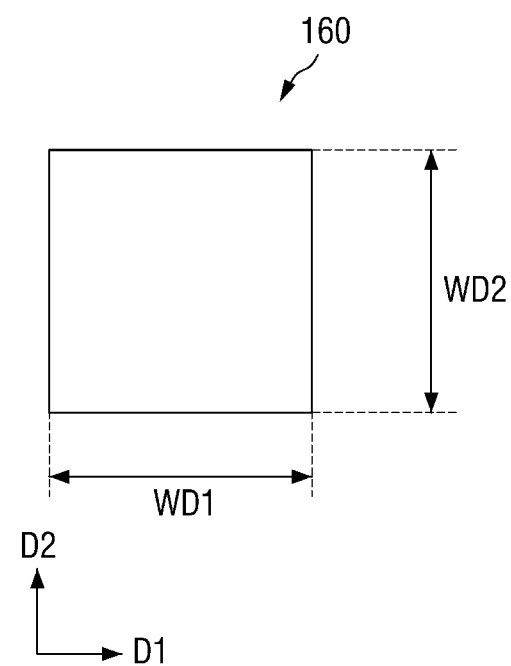
Figure 3A:
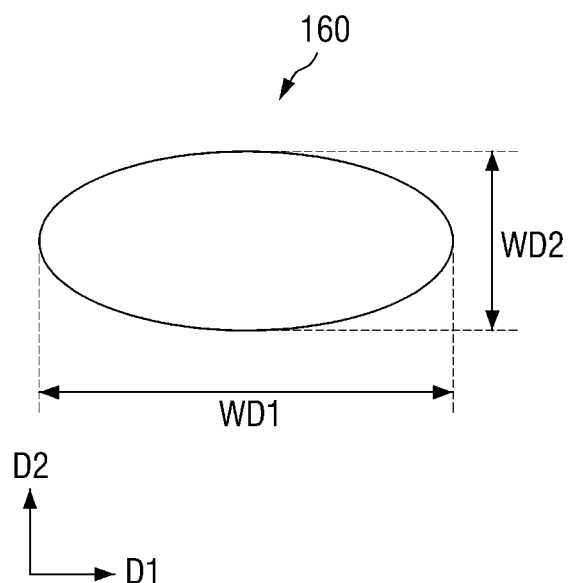
Figure 3B:
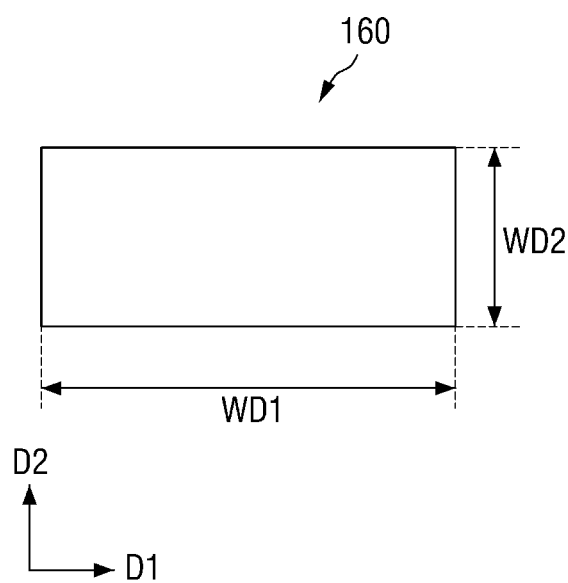
Figure 4:
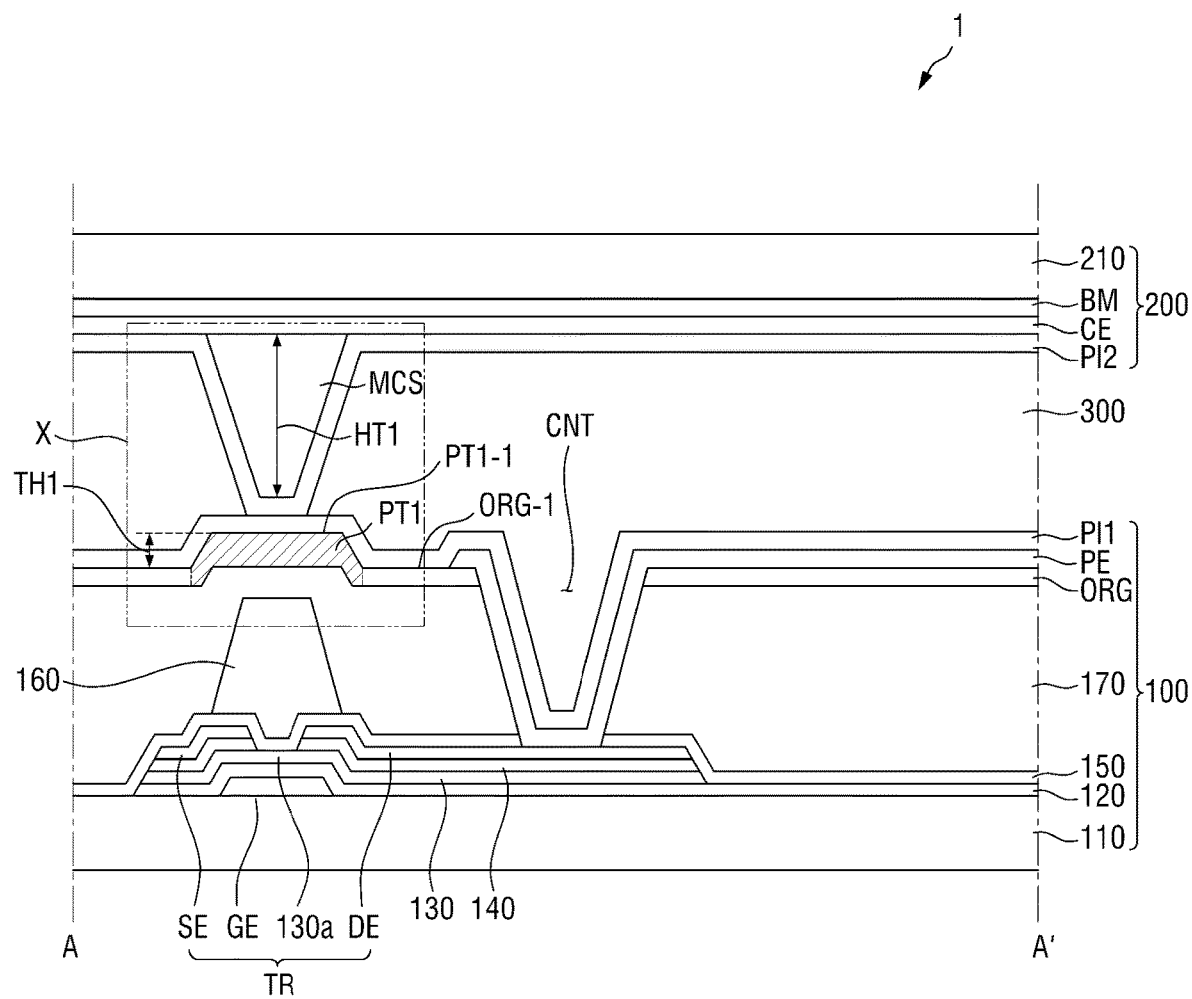
FIG. 4 is a cross-sectional view, taken along line A-A' of FIG. 1, of the display device of FIG. 1.

FIG. 1 is a layout view of a pixel of a display device according to an exemplary embodiment of the present invention, FIGS. 2A, 2B, 3A, and 3B are plan views illustrating examples of a protruding part of FIG. 1, and FIG. 4 is a cross-sectional view, taken along line A-A' of FIG. 1, of the display device of FIG. 1.

Referring to FIGS. 1 through 4, a display device 1 may include a first display substrate 100, a second display substrate 200 facing the first display substrate 100, and a liquid crystal layer 300 disposed between the first and second display substrates 100 and 200.

The first display substrate 100 may be, for example, a thin-film transistor (TFT) substrate on which TFTs, which are switching elements for driving liquid crystal molecules in the liquid crystal layer 300, are formed.

The second display substrate 200 may be a substrate facing the first display substrate 100.

A plurality of first column spacers MCS may be disposed between the first and second display substrates 100 and 200 to maintain the distance (i.e., the cell gap) between the first and second display substrates 100 and 200. The first column spacers MCS may extend across the liquid crystal layer 300 in a thickness direction. The first column spacers MCS may be included and installed in at least one of the first and second display substrates 100 and 200. In the exemplary embodiment of FIG. 1, the first column spacers MCS may be included in the second display device 200.

The display device 1 may further include a polarization unit. The polarization unit may be included in one of the first and second display substrates 100 and 200. Alternatively, the polarization unit may be provided as a separate element from the first and second display substrates 100 and 200.

The first and second display substrates 100 and 200 will hereinafter be described.

The first display substrate 100 includes a first insulating substrate 110 as its base. The first insulating substrate 110 may be transparent. For example, the first insulating substrate 110 may be provided as a glass substrate, a quartz substrate, or a transparent resin substrate.

The first insulating substrate 110 may include a pixel area PA. The pixel area PA may be an area in which a pixel, which is the minimal unit for displaying an image, is disposed. The pixel area PA may include a light-transmitting area TA and a light-blocking area BA. The light-blocking area BA may be an area overlapping with a light-blocking member BM of the second display substrate 200. A pixel electrode PE may be disposed in the light-transmitting area TA of the pixel area PA, and a switching element may be disposed in the light-blocking area BA of the pixel area PA. The switching element may be, for example, a TFT TR.

A gate line GL and a gate electrode GE may be disposed on the first insulating substrate 110. The gate line GL may transmit a gate signal and may extend mainly in one direction. For convenience, it is assumed that the gate line GL extends in a horizontal direction or a first direction D1. The gate electrode GE may be projected from the gate line GL and may be connected to the gate line GL. In some exemplary embodiments, the gate line GL and the gate electrode GE may comprise an aluminum (Al)-based metal such as Al or an Al alloy, a silver (Ag)-based metal such as Ag or an Ag alloy, a copper (Cu)-based metal such as Cu or a Cu alloy, and a molybdenum (Mo)-based metal such as Mo or a Mo alloy, chromium (Cr), tantalum (Ta), or titanium (Ti).

A gate insulating film 130 may be disposed on the gate line GL and on the gate electrode GE. The gate insulating film 120 may be formed of an insulating material. For example, the gate insulating film 120 may be formed of silicon nitride, silicon oxide, or silicon oxynitride. The gate insulating film 120 may have a single-layer structure or a multilayer structure consisting of at least two insulating layers having different physical characteristics.

A semiconductor layer 130 may be disposed on the gate insulating film 120 and may at least partially overlap with the gate electrode GE. The semiconductor layer 130 is illustrated as having a linear shape and overlapping not only with the gate electrode GE, but also with data wiring (DL, SE, and DE), but the inventive concepts are not limited thereto. That is, alternatively, the semiconductor layer 130 may be formed in an island shape only in an area overlapping with the gate electrode GE.

The semiconductor layer 130 may include amorphous silicon, polycrystalline silicon, or an oxide semiconductor.

Ohmic contact members 140 may be disposed on the semiconductor layer 130. The ohmic contact members 140 may be formed of n+ hydrogenated amorphous silicon doped with a high concentration of n-type impurities or may be formed of silicide. The ohmic contact members 140 may be paired with each other to be disposed on the semiconductor layer 130. In some exemplary embodiments, in a case where the semiconductor layer 130 is formed of an oxide semiconductor, the ohmic contact members 140 may not be provided.

A data line DL may be disposed on the gate insulating film 120. The data line DL may be insulated from the gate line GL by the gate insulating film 120 and may intersect the gate line GL. For convenience, it is assumed that the data line DL extends in a vertical direction or a second direction D2.

An area defined by the data line DL and the gate line GL, which intersect each other, may correspond to the pixel area PA. The data line DL and the gate line GL may be disposed in the light-blocking area BA, and the light-transmitting area TA may be provided in the area defined by the data line DL and the gate line GL.

A source electrode SE may be connected to the data line DL and may overlap with the gate electrode GE. In some exemplary embodiments, as illustrated in FIG. 1, the source electrode SE may be projected from the data line DL to overlap with the gate electrode GE, but the present disclosure is not limited thereto. In other exemplary embodiments, the source electrode SE may be disposed on the same line as the data line DL, instead of being projected from the data line DL.

A drain electrode DE may be spaced apart from the source electrode SE over the gate electrode GE and may be disposed to face the source electrode SE. The drain electrode DE may include an expanded portion having an expanded width in the area of contact with the pixel electrode PE.

The source electrode SE and the drain electrode DE may be disposed on the ohmic contact members 140.

In some exemplary embodiments, the data line DL, the source electrode SE, and the drain electrode DE may be formed of Al, Cu, Ag, Mo, Cr, Ti, Ta, or an alloy thereof.

The gate electrode GE, the source electrode SE, and the drain electrode DE may form a switching element, e.g., the TFT TR, together with the semiconductor layer 130. The TFT TR may be disposed in the light-blocking area BA of the pixel area PA.

A passivation layer 150 may be disposed on the gate insulating film 130, the semiconductor layer 130, the source electrode SE, and the drain electrode DE. The passivation layer 150 may comprise an inorganic insulating material such as silicon oxide, silicon nitride, or silicon oxynitride. The passivation layer 150 may protect the TFT TR and may prevent the material of a color filter layer 170 from being infiltrated into the semiconductor layer 130.

A contact hole CNT, which exposes a part of the drain electrode DE, may be formed in the passivation layer 150. The contact hole CNT may be formed to penetrate not only the passivation layer 150, but also the color filter layer 170 and an organic layer ORG. The contact hole CNT may be disposed to overlap with the light-blocking area BA.

A height difference generation pattern 160 may be disposed on the passivation layer 150. The height difference generation pattern 160 has a predetermined thickness and causes a height difference to be generated in the thickness direction. As will be described later, the color filter layer 170, the organic layer ORG, and an alignment film PI1 are sequentially disposed on the height difference generation pattern 160. The color filter layer 170, the organic layer ORG, and the alignment film PI1 may have a greater height in a first area A1 where they overlap with the height difference generation pattern 160 than in a second area A2 where they do not overlap with the height difference generation pattern 160. Accordingly, a height difference may be defined between the first and second areas A1 and A2.

The height difference generation pattern 160 may be disposed to overlap with the light-blocking area BA. The height difference generation pattern 160 may not overlap with the contact hole CNT.

In a plan view, the height difference generation pattern 160 may have a first width WD1 in the first direction D1 and a second width WD2 in the second direction D2.

In a plan view, the height difference generation pattern 160 may have a circular shape or a square shape, as illustrated in FIG. 2A or FIG. 2B. That is, the first and second widths WD1 and WD2 of the height difference generation pattern 160 may be the same. The first and second widths WD1 and WD2 of the height difference generation pattern 160 may have a maximum value of 30 μm to 40 μm. For example, the first and second widths WD1 and WD2 of the height difference generation pattern 160 may have a maximum value of 35 μm.

The relationship between the first and second widths WD1 and WD2 is not particularly limited in the inventive concepts. That is, alternatively, in a plan view, the height difference generation pattern 160 may have an elliptical shape or a rectangular shape, as illustrated in FIG. 3A or FIG. 3B. In this case, the first width WD1 may be greater than the second width WD2. Specifically, the first width WD1 of the height difference generation pattern 160 may have a maximum value of 35 μm to 45 μm, and the second width WD2 of the height difference generation pattern 160 may have a maximum value of 30 μm to 40 μm. For example, the first width WD1 may have a maximum value of 45 μm, and the second width WD2 may have a maximum value of 35 μm.

The height difference generation pattern 160 may comprise a photosensitive organic insulating material and may further comprise a first color pigment. For example, the first color pigment may be one of a red pigment, a green pigment, and a blue pigment, but the present disclosure is not limited thereto. In another example, the first color pigment may be of another primary color such as magenta, cyan, or yellow.

The height difference generation pattern 160 may comprise the same material as a color filter layer included in a pixel of a different color from the pixel in which the height difference generation pattern 160 is disposed. For example, if the height difference generation pattern 160 is disposed in a blue pixel, the height difference generation pattern 160 may comprise the same material as a red color filter layer included in a red pixel or a green color filter included in a green pixel. The height difference color pattern 160 and the color filter layer included in the pixel of a different color from the pixel in which the height difference generation pattern 160 is disposed may be formed at the same time. In this case, the height (or the thickness) of the height difference generation pattern 160 may be substantially the same as the height (or the thickness) of the color filter layer included in the pixel of a different color from the pixel in which the height difference generation pattern 160 is disposed, but the present disclosure is not limited thereto. That is, the height (or the thickness) of the height difference generation pattern 160 may be different from the height (or the thickness) of the color filter layer included in the pixel of a different color from the pixel in which the height difference generation pattern 160 is disposed depending on a set of processing conditions used. That is, by using a halftone mask or using patterns of different sizes, the height difference generation pattern 160 and the color filter layer 170 may be formed intentionally to have different heights.

In some exemplary embodiments, the height difference generation pattern 160 may be disposed to overlap with the TFT TR. In a case where the height difference generation pattern 160 overlaps with the TFT TR, the height of a first protruding part PT1 disposed above the height difference generation pattern 160 may be affected not only by the thickness of the height difference generation pattern 160, but also by the thickness of the TFT TR.

The height difference generation pattern 160 may be disposed to cover a channel region of the semiconductor layer 130 of the TFT TR. The height difference generation pattern 160 may be disposed to overlap with the TFT TR and may thus uniformly maintain the rate of change of a threshold voltage Vth of the TFT TR. Specifically, some of the reflected light of external light or incident light from a backlight unit may enter the TFT TR. In response to blue light, which is short-wavelength light, being incident upon the channel region of the TFT TR, the threshold voltage Vth of the TFT TR may change. The more the TFT TR is exposed to short-wavelength light, the greater the rate of change of the threshold voltage Vth becomes. The color filter layer 170 is disposed above the TFT TR. Each red or green pixel has their TFT covered with a red or green color filter layer and can thus block the entrance of blue light. On the other hand, in each blue pixel, the entrance of blue light cannot be blocked simply by a blue color filter layer. If the rate of change of the threshold voltage of the TFT of each blue pixels is greater than the rate of change of the threshold voltages of each red or green pixel, the transmittance of each blue pixel is lower than the transmittance of each red or green pixel, and as a result, the display device 1 may generally become yellowish. As already mentioned above, the height difference generation pattern 160, which comprises a red or green pigment, may be disposed above the TFT TR to overlap with the TFT TR. Then, even if blue light penetrates through the color filter layer 170, the entrance of the blue light into the TFT TR can be blocked by the height difference generation pattern 160. Accordingly, any discrepancy in the rate of change of the threshold voltage Vth of the TFT TR over time can be reduced. To maximize the blue light blocking effect of the height difference generation pattern 160, the height difference generation pattern 160 may be formed of the same material as a red color filter layer.

In some exemplary embodiments, the height difference generation pattern 160 may be disposed only in some pixels. For example, the height difference generation pattern 160 may be disposed above the TFT of each blue pixel, but not above the TFT of each red or green pixel. For example, the height difference generation pattern 160 may be disposed only above the TFT overlapping each first column spacer.

The color filter layer 170 may be disposed above the height difference generation pattern 170 and the passivation layer 150. The color filter layer 170 may be disposed to overlap with the light-blocking area TA. In some exemplary embodiments, the color filter layer 170 may not overlap with the light-blocking area BA or may overlap only with the edges of the light-blocking area BA. The color filter layer 170 may overlap with the height difference generation pattern 160 and may be disposed to cover the height difference generation pattern 160.

The color filter layer 170 may be formed of a photosensitive organic insulating material and may comprise a second color pigment, which has a different color from the height difference generation pattern 160. For example, the second color pigment may be one of a red pigment, a green pigment, and a blue pigment, but the present disclosure is not limited thereto. In another example, the second color pigment may be of another primary color such as magenta, cyan, or yellow.

In a case where the color filter layer 170 comprises a red pigment, a green pigment, or a blue pigment, the color filter layer 170 may serve as a red filter R, a green filter G, or a blue filter B.

The top surface of the color filter 170 may reflect some of the shape of the height difference generation pattern 160. That is, a part of the color filter layer 170 overlapping with the height difference generation pattern 160 may protrude upwardly as compared to the rest of the color filter layer 170. For example, the height of the protruding part of the color filter layer 170 may be less than the height of the height difference generation pattern 160. That is, the protruding part of the color filter layer 170 may only mildly reflect the shape of the height difference generation pattern 160. The width of the protruding part of the color filter layer 170 may be greater than the width of the height difference generation pattern 160, but the present disclosure is not limited thereto.

The organic layer ORG may be disposed on the color filter layer 170. The organic layer ORG may be formed of a photosensitive organic insulating material. The organic layer ORG may protect the color filter layer 170.

The organic layer ORG may include a protruding part PT. The protruding part PT may be disposed to overlap with the light-blocking area BA. The protruding part PT may overlap with the TFT TR. The protruding part PT may include a first protruding part PT1 which is disposed in a pixel where a height difference generation pattern is disposed and reflects the thicknesses of both a TFT and the height difference generation pattern and a second protruding part PT2 which reflects only the thickness of a TFT in a pixel where a height difference generation pattern is not disposed. The height of the second protruding part PT2 may be less than the height of the first protruding part PT1. This will be described later in detail.

The pixel electrode PE may be disposed on the organic layer ORG. The pixel electrode PE may be disposed to overlap with the light-transmitting area TA of the pixel area PA. The pixel electrode PE may not overlap with the protruding part PT of the organic layer ORG. A part of the pixel electrode PE may extend to overlap with the light-blocking area BA and may be physically and electrically connected to the drain electrode DE through the contact hole CNT, and as a result, the pixel electrode PE may receive a voltage from the drain electrode DE. The pixel electrode PE may be formed of a transparent conductive material such as indium tin oxide (ITO), indium zinc oxide (IZO), indium tin zinc oxide (ITZO), or aluminum-doped zinc oxide (AZO).

The pixel electrode PE may include a stem PEa, a plurality of branches PEb, and a protrusion PEc. The pixel electrode PE may further include branch connectors CNz connecting at least some of the ends of the branches PEb.

The stem PEa may include a horizontal stem PEah extending mostly in the horizontal direction and a vertical stem PEav extending mostly in the vertical direction, and the stem PEa may divide the pixel electrode PE into a plurality of sub-regions, e.g., a plurality of domains. In some exemplary embodiments, the horizontal and vertical stems PEah and PEav may intersect each other, and as a result, the stem PEa may be in the shape of a cross. In this case, the pixel electrode PE may be divided into four sub-regions, i.e., four domains. The direction in which the branches PEb extend may differ from one sub-region to another sub-region. For example, referring to FIG. 1, the branches PEb may extend diagonally from the stem PEa in an upper right direction in an upper right sub-region, may extend diagonally from the stem PEa in a lower right direction in a lower right sub-region, may extend diagonally from the stem PEa in an upper left direction in an upper left sub-region, and may extend diagonally from the stem PEa in a lower left direction in a lower left sub-region. The angle that the direction in which the gate line GL extends forms with the branches PEb, the angle that the horizontal stem PEah forms with the branches PEb, or the angle that the vertical stem PEav forms with the branches PEb may be about 45 degrees, but the present disclosure is not limited thereto.

The stem PEa may have various shapes other than that set forth herein. For example, the pixel electrode PE may be divided into one sub-region, two sub-regions, or three sub-regions depending on the shape of the stem PEa.

A first alignment film PI1 may be disposed on the organic layer ORG and the pixel electrode PE. The first alignment film PI1 may reflect a height difference formed by the first protruding part PT1. The first alignment film PI1 may be formed of an organic material such as PI, but the present disclosure is not limited thereto. The first alignment film PI1 may be a vertical alignment film or a horizontal alignment film.

The second display substrate 200 may include a second insulating substrate 210, a common electrode CE, a light-blocking member (or a black matrix) BM, and a first column spacer MCS.

The second display substrate 200 may include the second insulating substrate 210 as its base.

The second insulating substrate 210 may be provided as a glass substrate, a quartz substrate, or a transparent resin substrate.

The light-blocking member BM may be disposed on the second insulating substrate 210. The light-blocking member BM may overlap with the light-blocking area BA. The light-blocking member BM may overlap with the TFT TR, which includes the gate electrode GE, the semiconductor layer 130, the source electrode SE, and the drain electrode DE, and may also overlap with the contact hole CNT, the gate line GL, and the data line DL. The light-blocking member BM may comprise a light-blocking pigment, such as black carbon, or may include a photosensitive organic material.

The common electrode CE may be disposed above the second insulating substrate 210. In some exemplary embodiments, the common electrode CE may be formed above the second insulating substrate 210 as a plate and may receive a common voltage of a predetermined magnitude. The common electrode CE may be formed of, for example, a transparent conductive material such as ITO, IZO, ITZO, or AZO.

The first column spacer MCS is disposed on the common electrode CE. The first column spacer MCS may be a main column spacer that maintains the gap between the first and second display substrates 100 and 200.

The first column spacer MCS may overlap with the first protruding part PT1 of the first display substrate 100. An end of the first column spacer MCS may face the first protruding part PT1. The first column spacer MCS may be formed of an organic insulating material and may have photosensitivity.

A second alignment film PI2 is disposed on the first column spacer MCS and the common electrode CE. The second alignment film PI2 may be formed of an organic material such as PI, but the inventive concepts are not limited thereto. The second alignment film PI2 may be a vertical alignment film or a horizontal alignment film.

The first alignment film PI1, which covers the first protruding part PT1 of the organic film ORG, may be in direct contact with a part of the second alignment film PI2 disposed at the end of the first column spacer MCS. In some exemplary embodiments, at least one of the first and second alignment films PI1 and PI2 may not be provided. In this case, the material that the first protruding part PT1 and the first column spacer MCS are both in contact with may obviously vary. For example, when the first and second alignment films PI1 and PI2 are both not provided, the first protruding part PT1 and the first column spacer MCS may be in direct contact with each other.

The part of the first alignment film PI1 disposed on the first protruding part PT1 protrudes beyond the rest of the first alignment film PI1. If a part of the first alignment film PI1 corresponding to the first column spacer MCS protrudes with a sufficient height difference from the rest of the first alignment film PI1, damage to the first alignment film PI1 can be prevented. This will hereinafter be described in detail with reference to FIG. 5.

Figure 5A:
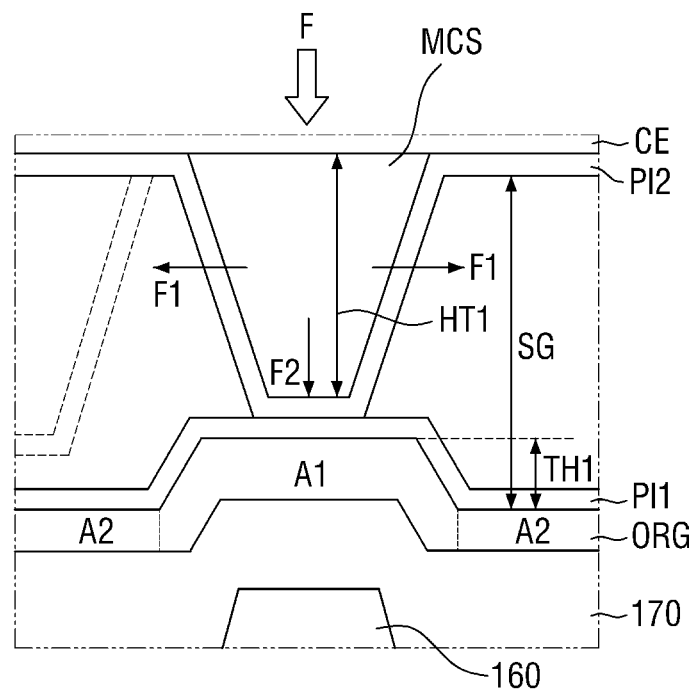
FIG. 5A and FIG. 5B show enlarged cross-sectional views of a part X of FIG. 4.
Figure 5B:
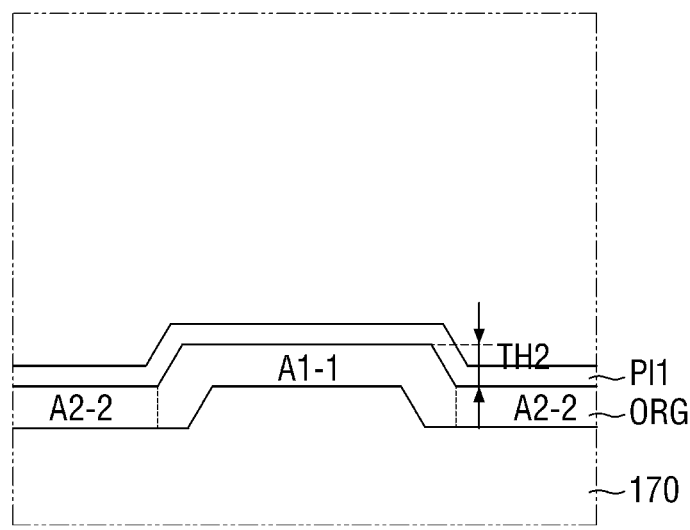
Figure 8:
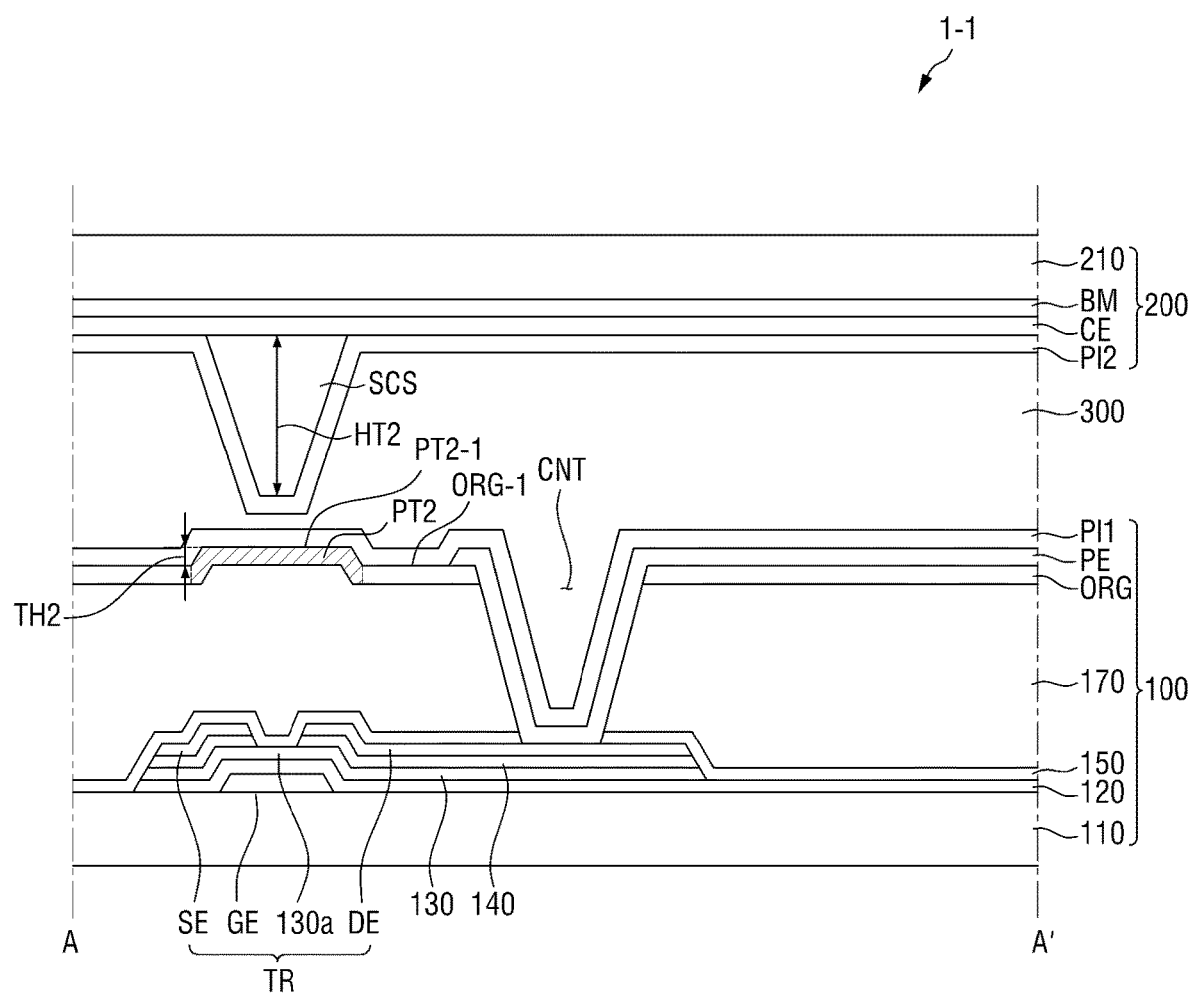
FIG. 8 is a cross-sectional view, taken along line A-A' of FIG. 1, of a display device according to another exemplary embodiment of the present invention.

FIGS. 5A and 5B show cross-sectional views for explaining a change in the display device of FIG. 1 before and after the application of pressure. Specifically, FIG. 5A illustrates a part where the first protruding part PT1 and the first column spacer MCS overlap with each other, i.e., a part X of FIG. 4, and FIG. 5B illustrates a part where the second protruding part PT2 is disposed (FIG. 8).

Referring to FIG. 5A, in the area where the height difference generation pattern 160 is disposed, a difference between the height of a top surface ORG-1 of a part of the organic layer ORG overlapping with a peripheral part of the height difference generation pattern 160 and a top surface PT1-1 of the first protruding part PT1, i.e., a height TH1 of the first protruding part PT1, may be 0.6 μm to 0.8 μm. For example, the height TH1 of the first protruding part PT1 may be about 0.7 μm.

On the other hand, referring to FIG. 5B, the second protruding part PT2 is provided on the organic layer ORG due to the thickness of the TFT TR below the organic layer ORG, but since the height difference generation pattern 160 is not provided (FIG. 8), the height of the second protruding part PT2 is less than the height of the first protruding part PT1. For example, the height of the second protruding part PT2 may be about 0.3 µm.

When an external force F is applied to the display device 1, the first column spacer MCS may absorb some of the external force F and may thereby be compressed, and at the same time, due to the external force F, a horizontal moving force F1 may be applied to the first column spacer MCS to move the first column spacer MCS in the horizontal direction. If the first column spacer MCS is moved by the horizontal moving force F1, the end of the first column spacer MCS (or the second alignment film PI1 at the end of the first column spacer MCS) may be placed in direct contact with the surface of the first display substrate 100 (or the first alignment film PI1) and may thereby damage the surface of the first display substrate 100.

As illustrated in FIG. 5A, not only the horizontal moving force F1, but also a vertical drag F2, is applied to the first column spacer MCS in the first area A1 that overlaps with the first protruding part PT1, which is disposed below the first column spacer MCS and has a predetermined height HT1. If the first column spacer MCS is moved sideways to the second area A2 by the external force F and thereby no longer overlaps with the first protruding part PT1, the height of the first column spacer MCS, shrunk by the vertical drag F2, may be restored so that the first column spacer MCS can become taller. In this case, the end of the first column spacer MCS may become closer to the surface of the first display substrate 100 (i.e., the surface of the first alignment film PI1) in the second area A2. However, since the first protruding part PT1 has a sufficient height, the risk of the end of the first column spacer MCS being placed in direct contact with the surface of the first display substrate 100 can be reduced, and this becomes more apparent when comparing the first protruding part PT1 with the second protruding part PT2, which has a height of only about 0.3 µm because of the absence of the height difference generation pattern 160. That is, since the height of the first protruding part PT1 is increased by the height difference generation pattern 160, the probability of the surface of the first display substrate 100 being damaged by the first protruding part PT1 can be lowered. Accordingly, the first alignment film PI1 can be prevented from being damaged in the second area A2, and as a result, light leakage can be prevented.

Display devices according to other exemplary embodiments of the present invention will hereinafter be described. Like reference numeral indicate like elements throughout the present disclosure, and the display devices according to other exemplary embodiments of the present invention will hereinafter be described, focusing mainly on differences with the display device 1 of FIG. 1.

Figure 6:
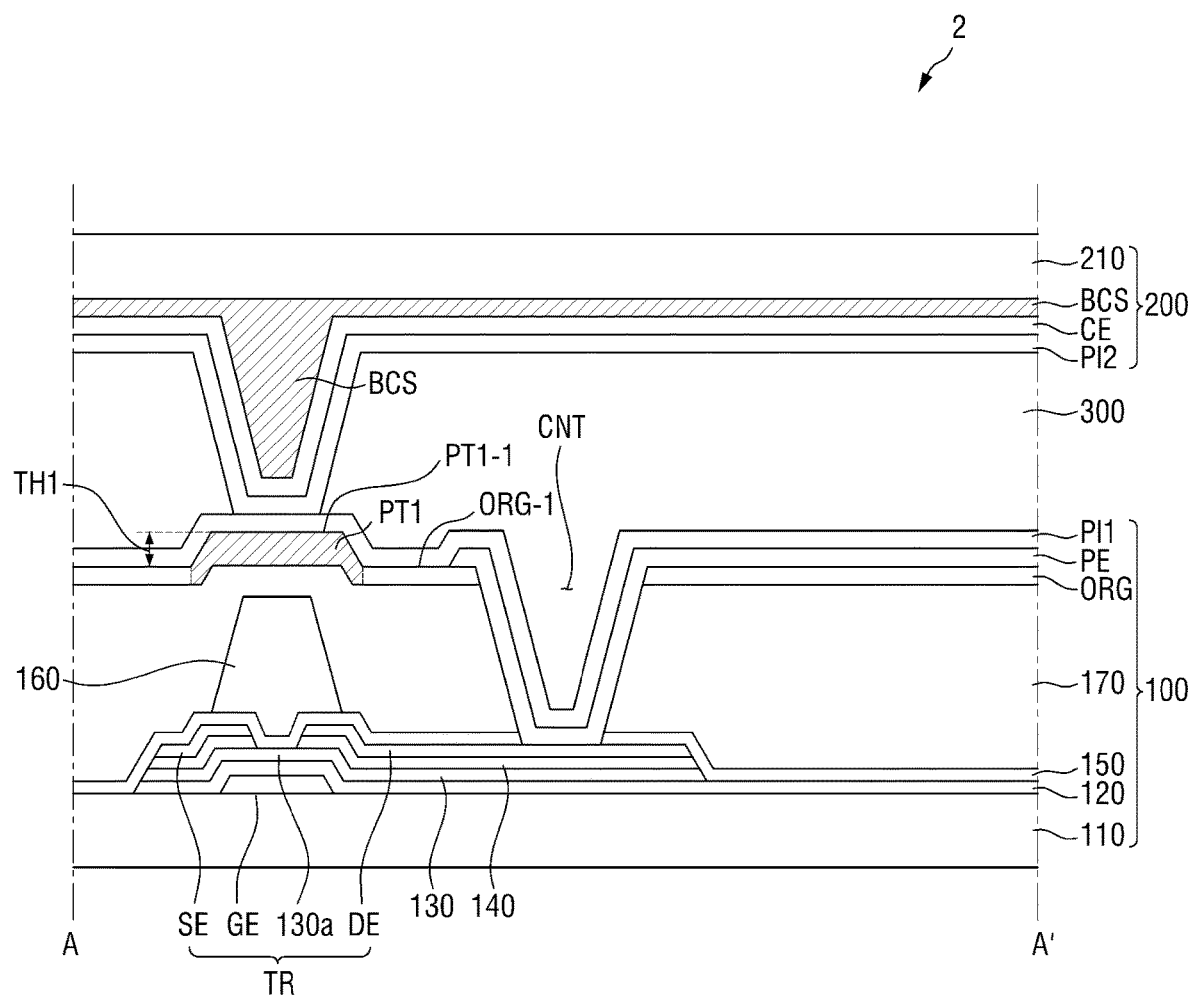
FIG. 6 is a cross-sectional view, taken along line A-A' of FIG. 1, of a display device according to another exemplary embodiment of the present invention.

FIG. 6 is a cross-sectional view, taken along line A-A' of FIG. 1, of a display device according to another exemplary embodiment of the present invention.

Referring to FIG. 6, a display device 2 differs from the display device 1 of FIG. 4 in that a light-blocking member and a first column spacer are integrally formed using the same material, and that a common electrode is disposed on the light-blocking member and the first column spacer.

Specifically, a black matrix column spacer BCS is disposed on a second insulating substrate 210. The black matrix column spacer BCS includes a black matrix portion and a black column spacer portion disposed on the black matrix portion. The black matrix portion and the black column spacer portion may be integrally formed using the same material. The black matrix portion may have substantially the same planar layout as the light-blocking member BM of FIG. 4. The black column spacer portion may have substantially the same planar layout as the first column spacer MCS of FIG. 4.

A common electrode CE is disposed on the black matrix column spacer BCS. The common electrode CE may be disposed not only on the black matrix portion, but also on the black column spacer portion of the black matrix spacer BCS. A second alignment film PI2 is disposed on the common electrode CE. The common electrode CE is interposed between the second alignment film PI2 and the black column spacer portion of the black matrix column spacer BCS.

A height difference generation pattern 160 of a first display substrate 100 is disposed to face an end of the black column spacer portion of the black matrix column spacer BCS. Accordingly, as described above with reference to FIG. 5, a sufficient height can be secured by a first protruding part PT1 in an area where the height difference generation pattern 160 faces the end of the black column spacer portion of the black matrix column spacer BCS, and as a result, damage to the surface of the first display substrate 100 can be prevented.

Figure 7:
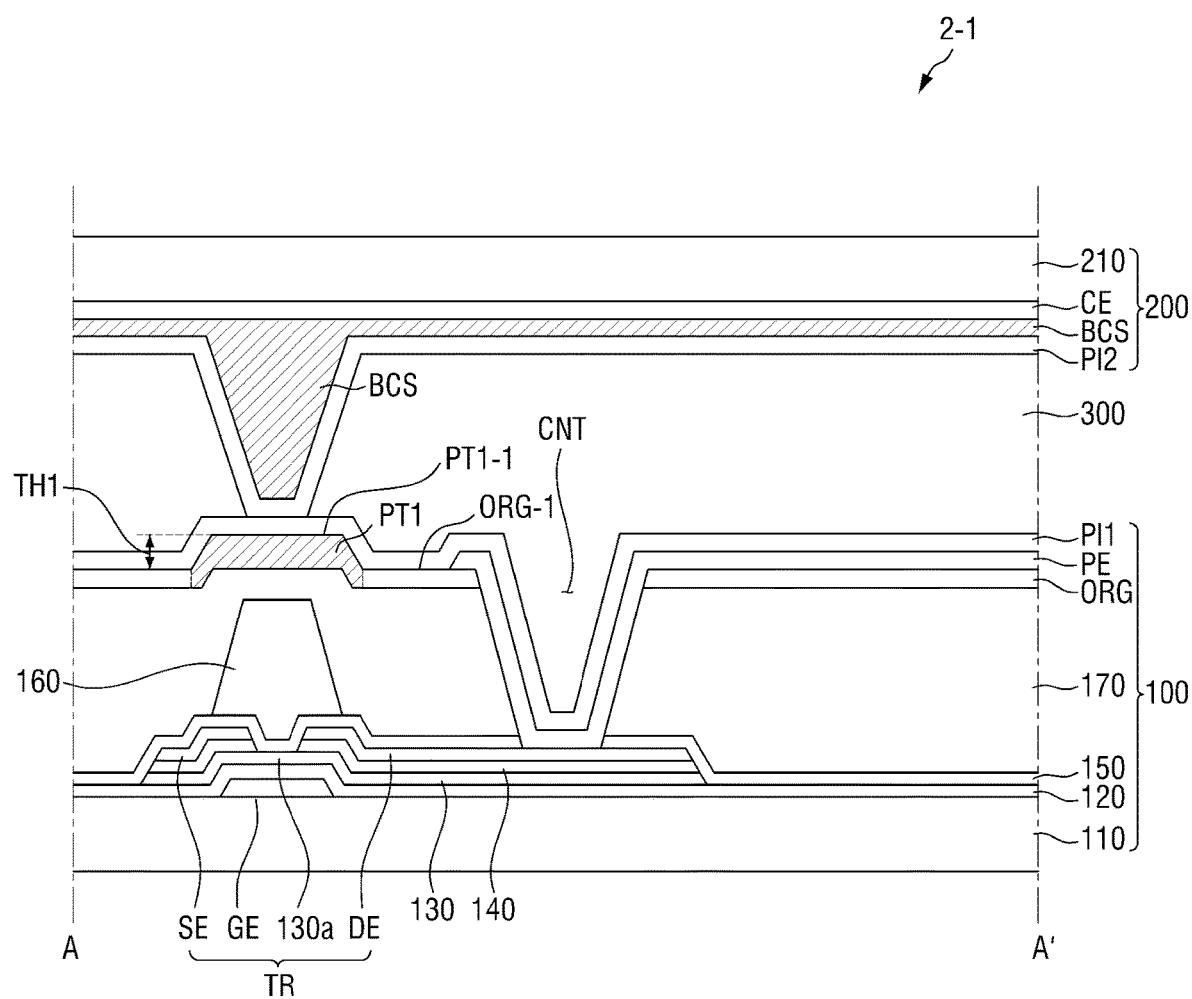
FIG. 7 is a cross-sectional view, taken along line A-A' of FIG. 1, of a display device according to another exemplary embodiment of the present invention.

FIG. 7 is a cross-sectional view, taken along line A-A' of FIG. 1, of a display device according to another exemplary embodiment of the present invention.

Referring to FIG. 7, a display device 2-1 differs from the display device 2 of FIG. 6 in the order in which a black matrix column spacer BCS and a common electrode CE are stacked.

Specifically, the common electrode CE is disposed on a second insulating substrate 210, and the black matrix column spacer BCS is disposed on the common electrode CE. A second alignment film PI2 is disposed on the black matrix column spacer BCS.

A height difference generation pattern 160 of a first display substrate 100 is disposed to face an end of a black column spacer portion of the black matrix column spacer BCS. Accordingly, as described above with reference to FIG. 5, a sufficient height can be secured by a first protruding part PT1 in an area where the height difference generation pattern 160 faces the end of the black column spacer portion of the black matrix column spacer BCS, and as a result, damage to the surface of a first display substrate 100 can be prevented.

FIG. 8 is a cross-sectional view, taken along line A-A' of FIG. 1, of a display device according to another exemplary embodiment of the present invention.

Referring to FIG. 8, a display device 1-1 differs from the display device 1 of FIG. 4 in that a height difference generation pattern 160 is not provided on a first insulating substrate 110.

Specifically, a gate electrode GE, a gate insulating film 120, a semiconductor layer 130, ohmic contact members 140, a source electrode SE, a drain electrode DE, and a passivation layer 150 may be disposed on the first insulating substrate 110, and a color filter layer 170 and an organic layer ORG that forms a second protruding part PT2 may be disposed on the passivation layer 150. The display device 1-1 may further include a first alignment film PI1 on the organic layer ORG.

A second display substrate 200 may be substantially the same as the second display substrate 200 of FIG. 4.

Figure 9:
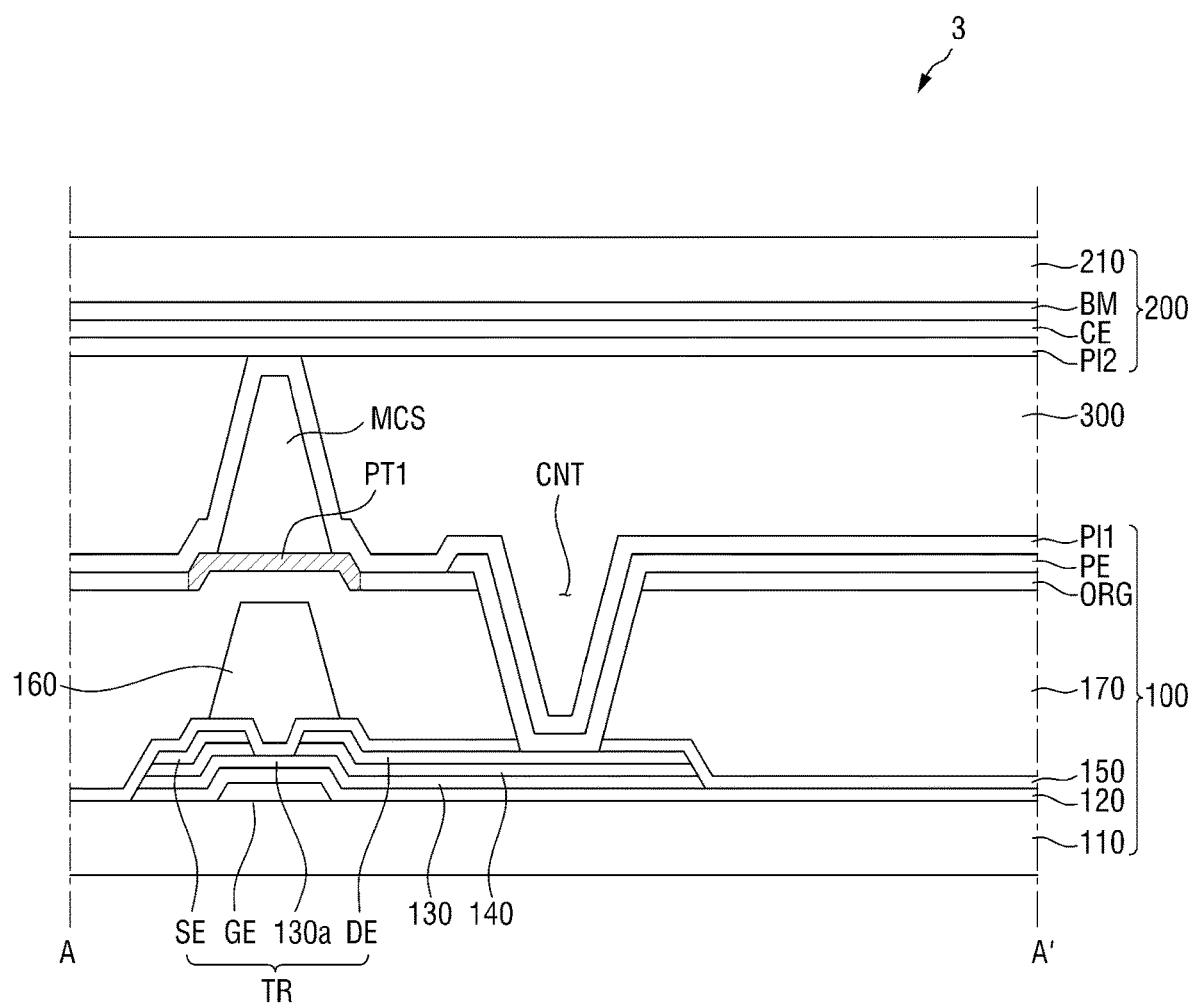
FIG. 9 is a cross-sectional view, taken along line A-A' of FIG. 1, of a display device according to another exemplary embodiment of the present invention.

FIG. 9 is a cross-sectional view, taken along line A-A' of FIG. 1, of a display device according to another exemplary embodiment of the present invention.

Referring to FIG. 9, a display device 3 differs from the display device 1 of FIG. 4 in that a first column spacer MCS is disposed directly above a first protruding part PT1 of an organic layer ORG.

Specifically, a gate electrode GE, a gate insulating film 120, a semiconductor layer 130, ohmic contact members 140, a source electrode SE, a drain electrode DE, a passivation layer 150, a height difference generation pattern 160, a color filter layer 170, and the organic layer ORG that forms the first protruding part PT1 may be disposed on a first insulating substrate 110, and the first column spacer MCS may be disposed directly above the first protruding part PT1 of the organic layer ORG. The display device 3 may further include a first alignment film PI1 formed on the first column spacer MCS.

A second display substrate 200 may include a second insulating substrate 210, a light-blocking member BM, and a common electrode CE, and may further include a second alignment film PI2.

Figure 10:
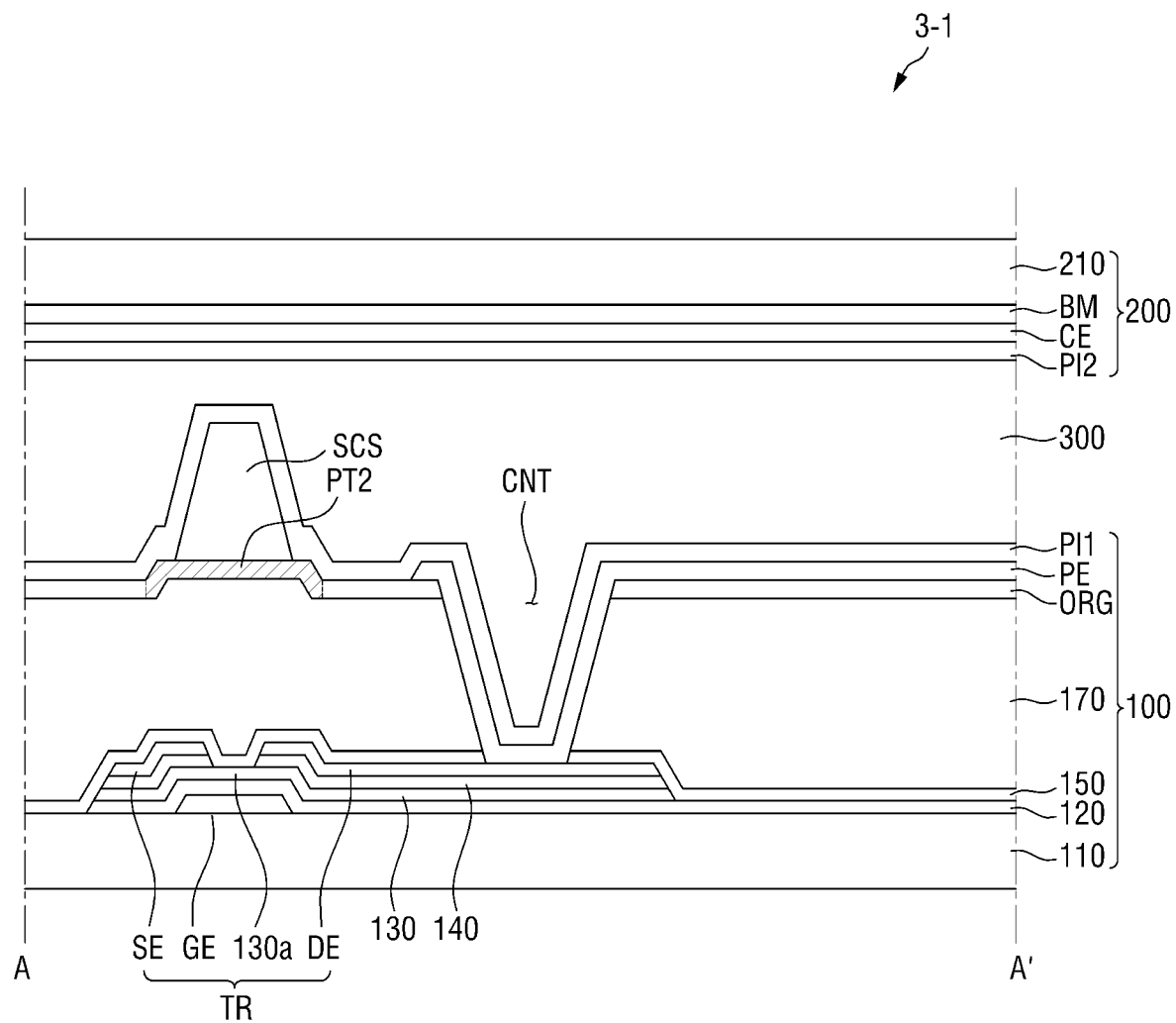
FIG. 10 is a cross-sectional view, taken along line A-A' of FIG. 1, of a display device according to another exemplary embodiment of the present invention.

FIG. 10 is a cross-sectional view, taken along line A-A' of FIG. 1, of a display device according to another exemplary embodiment of the present invention.

Referring to FIG. 10, a display device 3-1 differs from the display device 1-1 of FIG. 9 in that a height difference generation pattern 160 is not provided on a first insulating substrate 110.

Specifically, a gate electrode GE, a gate insulating film 120, a semiconductor layer 130, ohmic contact members 140, a source electrode SE, a drain electrode DE, and a passivation layer 150 may be disposed on the first insulating substrate 110, and a color filter layer 170 and an organic layer ORG that forms a second protruding part PT2 may be disposed on the passivation layer 150. A first alignment film PI1 may be formed on the organic layer ORG. A second column spacer SCS may be disposed on the second protruding part PT2 of the organic layer ORG. The display device 3-1 may further include a first alignment film PI1 on the second column spacer SCS.

A second display substrate 200 may be substantially the same as the second display substrate 200 of FIG. 9.

Figure 11:
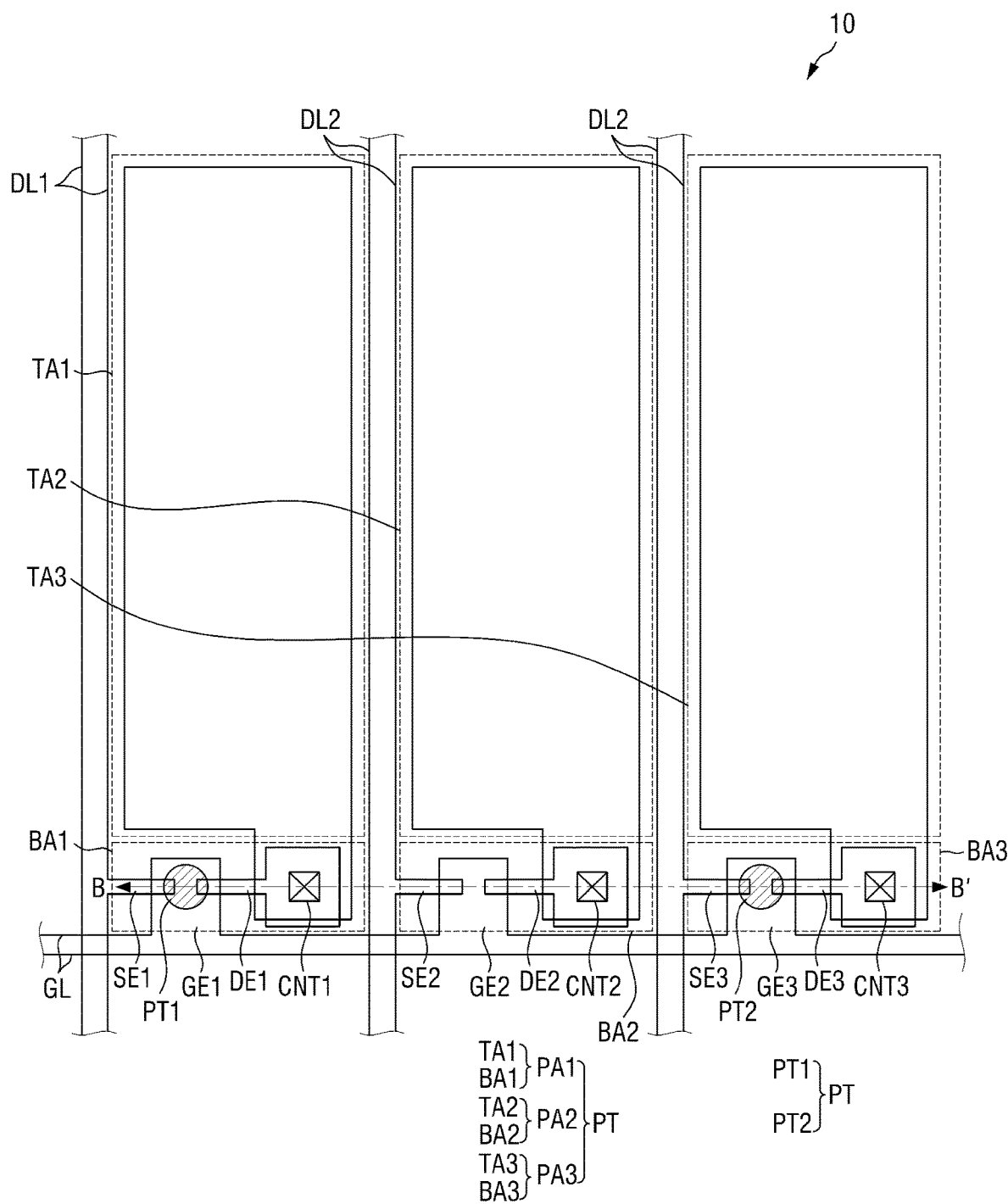
FIG. 11 is a layout view of a display device according to another exemplary embodiment of the present invention and illustrates an exemplary arrangement of gate lines, data lines, and protruding parts in the display device.

FIG. 11 is a layout view of a display device 10 according to another exemplary embodiment of the present invention and illustrates an exemplary arrangement of gate lines GL, data lines DL, and protruding parts (PT1 and PT2) in the display device 10.

Referring to FIG. 11, the display device 10 includes a first protruding part PT1 in a first light-blocking area BA1 of a first pixel area PA1 and a second protruding part PT2 in a third light-blocking area BA3 of a third pixel area PA3. In some exemplary embodiments, a height TH1 of the first protruding part PT1 may be greater than a height TH2 of the second protruding part PT2. Accordingly, due to the difference between the height TH1 of the first protruding part PT1 and the height TH2 of the second protruding part PT2, the same column spacer may become a main column spacer when disposed to overlap with the first protruding part PT1 and may become a sub-column spacer SCS when disposed to overlap with the second protruding part PT2. That is, the pixel configuration illustrated in FIG. 14 may be a pixel configuration in which one main column spacer MCS and one sub-column spacer SCS are provided.

Figure 12:
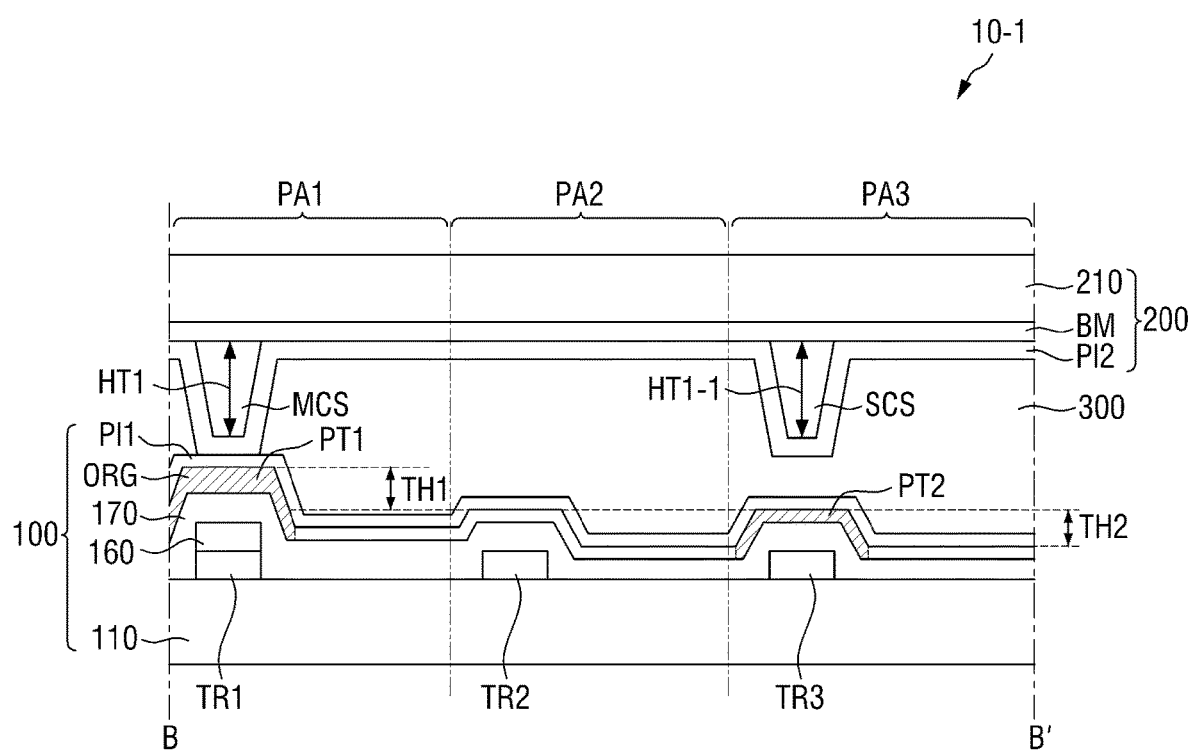
FIG. 12 is a cross-sectional view, taken along line B-B' of FIG. 11, of a display device according to another exemplary embodiment of the present invention.

FIG. 12 is a cross-sectional view, taken along line B-B' of FIG. 11, of a display device 10-1 according to another exemplary embodiment of the present invention.

The cross-sectional view of FIG. 4 may be a cross-sectional view of a first pixel area PA1 of FIG. 12, and the cross-sectional view of FIG. 8 may be a cross-sectional view of a third pixel area PA3 of FIG. 12.

Referring to FIGS. 4, 8, 11, and 12, the third pixel area PA3 differs from the first pixel area PA1 in that a height difference generation pattern 160 is not inserted in a color filter layer 170. A height HT1 of a main column spacer MCS in the first pixel area PA1 may be the same as a height HT1-1 of a sub-column spacer SCS in the third pixel area PA3, and a height TH1 of a first protruding part PT1 in the first pixel area PA1 may be greater than a height TH2 of a second protruding part PT2 in the third pixel area PA3. That is, as illustrated in FIG. 12, when there is no gap between the main column spacer MCS and a first display substrate 100, there may be a gap between the sub-column spacer SCS and the first display substrate 100. Since the height HT1 of the main column spacer MCS and the height HT1-1 of the sub-column spacer SCS are the same, the main column spacer MCS and the sub-column spacer SCS can be formed at the same time without using a multi-tone mask such as a halftone mask, and as a result, the manufacturing cost of the display device 10-1 can be reduced.

Figure 13:
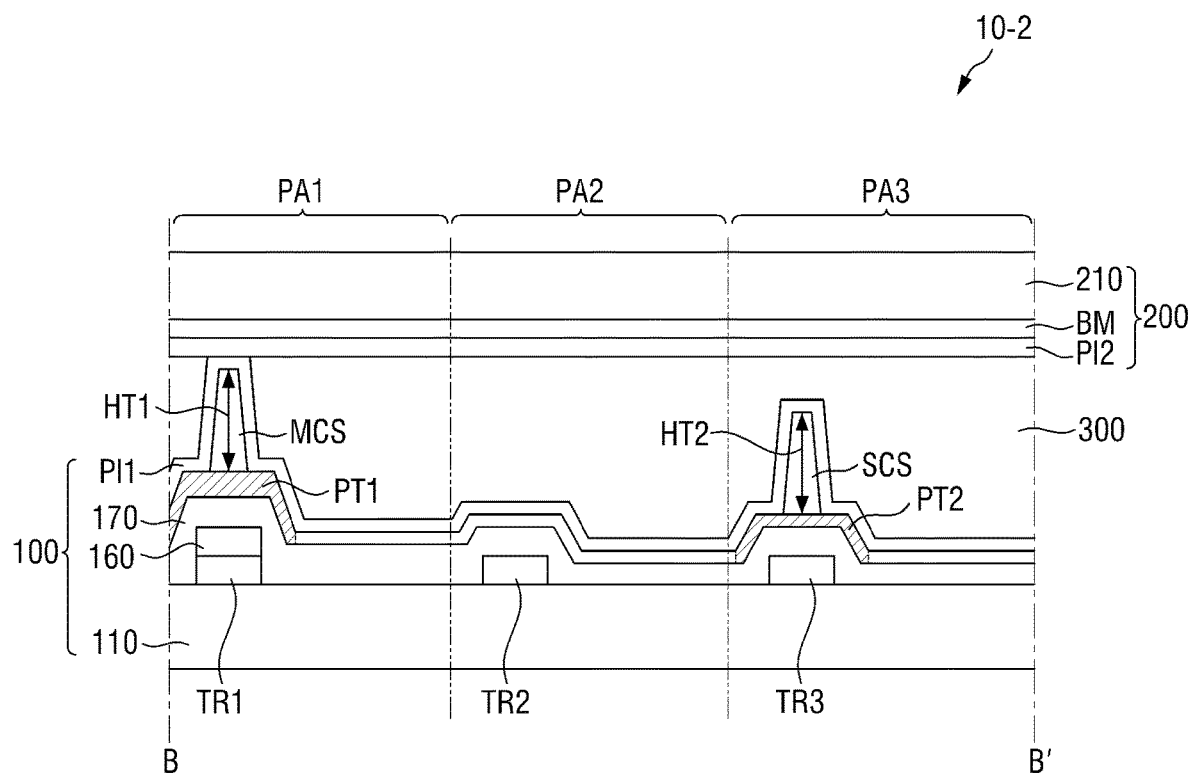
FIG. 13 is a cross-sectional view, taken along line B-B' of FIG. 11, of a display device according to another exemplary embodiment of the present invention.

FIG. 13 is a cross-sectional view, taken along line B-B' of FIG. 11, of a display device 10-2 according to another exemplary embodiment of the present invention.

The cross-sectional view of FIG. 9 may be a cross-sectional view of a first pixel area PA1 of FIG. 13, and the cross-sectional view of FIG. 10 may be a cross-sectional view of a third pixel area PA3 of FIG. 13.

Referring to FIGS. 9 through 13, the third pixel area PA3 differs from the first pixel area PA1 in that a height difference generation pattern 160 is not inserted in a color filter layer 170. A height HT1 of a main column spacer MCS in the first pixel area PA1 may be the same as a height HT1-1 of a sub-column spacer SCS in the third pixel area PA3, and a height TH1 of a first protruding part PT1 in the first pixel area PA1 may be greater than a height TH2 of a second protruding part PT2 in the third pixel area PA3. That is, as illustrated in FIG. 13, when there is no gap between the main column spacer MCS and a second display substrate 200, there may be a gap between the sub-column spacer SCS and a first display substrate 100. Since the height HT1 of the main column spacer MCS and the height HT1-1 of the sub-column spacer SCS are the same, the main column spacer MCS and the sub-column spacer SCS can be formed at the same time without using a multi-tone mask such as a halftone mask, and as a result, the manufacturing cost of the display device 10-1 can be reduced.

Figure 14:
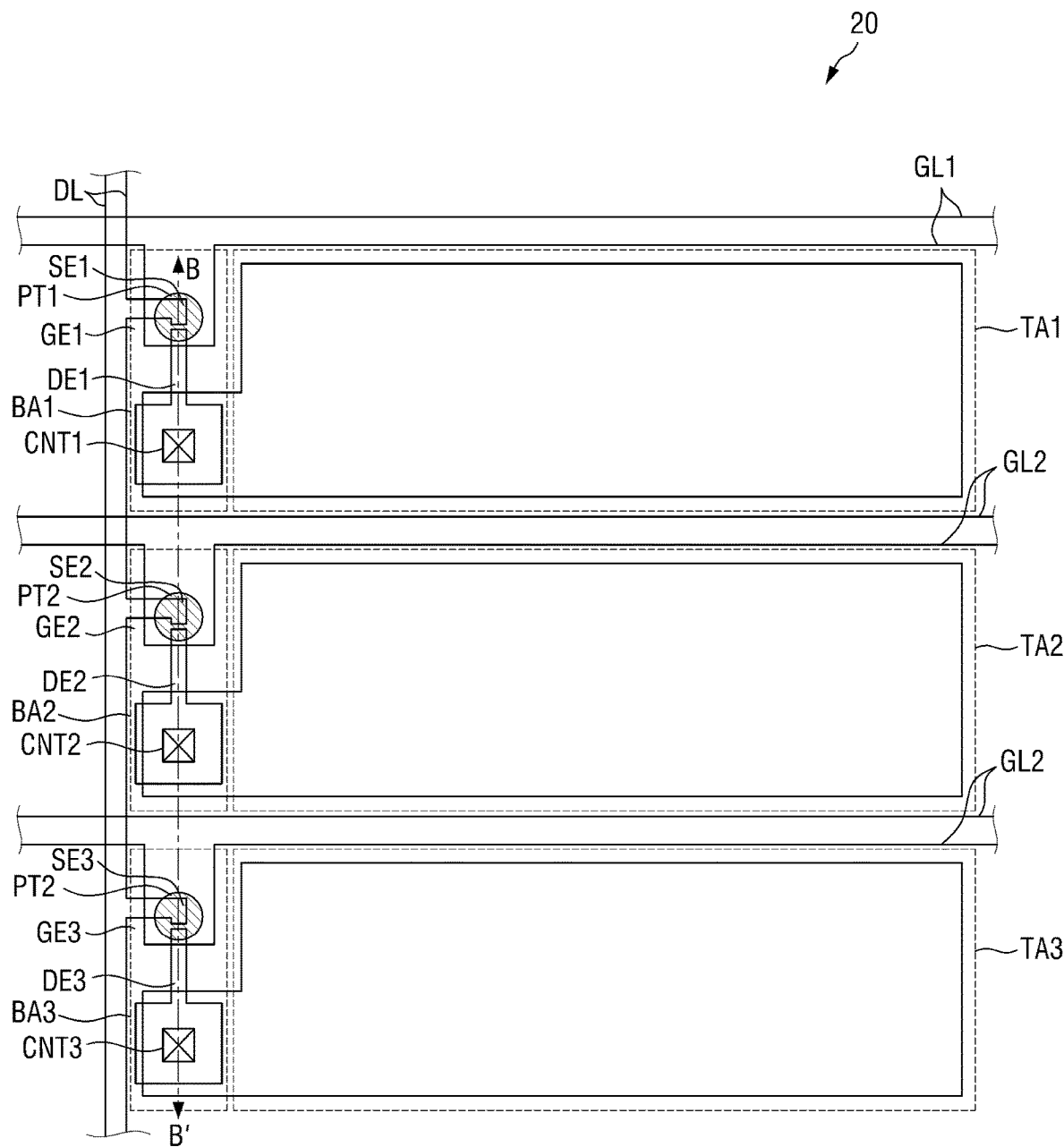
FIG. 14 is a layout view of a display device according to another exemplary embodiment of the present invention and illustrates an exemplary arrangement of gate lines, data lines, and protruding parts in the display device.

FIG. 14 is a layout view of a display device 20 according to another exemplary embodiment of the present invention and illustrates an exemplary arrangement of gate lines GL, data lines DL, and protruding parts (PT1 and PT2) in the display device 20.

Referring to FIG. 14, the display device 20 includes a first protruding part PT1 in a first light-blocking area BA1 of a first pixel area PA1, a second protruding part PT2 in a second light-blocking area BA2 of a second pixel area PA2, and another second protruding part PT2 in a third light-blocking area BA3 of a third pixel area PA3. In some exemplary embodiments, a height TH1 of the first protruding part PT1 may be greater than a height TH2 of the second protruding parts PT2. Accordingly, due to the difference between the height TH1 of the first protruding part PT1 and the height TH2 of the second protruding parts PT2, the same column spacer may become a main column spacer when disposed to overlap with the first protruding part PT1 and may become a sub-column spacer SCS when disposed to overlap with one of the second protruding parts PT2. That is, the pixel configuration illustrated in FIG. 14 may be a pixel configuration in which one main column spacer MCS and two sub-column spacers SCS are provided.

The display device 20 differs from the display device 10 of FIG. 11 in the directions in which the gate lines GL and the data lines DL extend.

According to the aforementioned and other exemplary embodiments of the present invention, the cell gap between two substrates can be uniformly maintained, and the two substrates can be prevented from being damaged by an external force.

In addition, short-wavelength light from blue color filters can be blocked, and the manufacturing cost of a display device can be reduced.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a first base;
    a switching element disposed on a surface of the first base;
    an insulating layer disposed on the switching element and overlapping with the switching element;
    a color filter disposed on the insulating layer and overlapping with the insulating layer;
    an organic layer disposed on the color filter and comprising a protruding portion overlapping with the insulating layer; and
    a pixel electrode disposed on the organic layer, the pixel electrode being electrically connected to the switching element,
    wherein:
    the organic layer includes a portion which does not overlap the switching element;
    a first height measured from the surface of the first base to an upper surface of the protruding portion is greater than a second height measured from the surface of the first base to an upper surface of the portion of the organic layer; and
    a height difference between the second height and the first height is 0.6 μm to 0.8 μm.

2. The display device of claim 1, wherein:
    the color filter includes a pigment of a first color, and the first color is one of red or green.

3. The display device of claim 1, wherein the protruding portion overlaps the color filter.

4. The display device of claim 1, wherein:
    the switching element comprises a semiconductor layer having a channel region; and
    the insulating layer overlaps the channel region.

5. The display device of claim 1, further comprising:
    an organic insulating pattern disposed on the organic layer and overlapping with the protruding portion.

6. The display device of claim 5, wherein the organic insulating pattern overlaps the color filter.

7. The display device of claim 1, further comprising a light-blocking member overlapping with the switching element and the insulating layer.

8. A display device comprising:
    a first base including a first pixel area and a second pixel area;
    a first switching element and a second switching element disposed on an upper surface of the first base, the first switching element located in the first pixel area and the second switching element located in the second pixel area;
    an insulating layer disposed on the first switching element and overlapping with the first switching element;
    a first color filter disposed on the first switching element and the insulating layer;
    a second color filter disposed on the second switching element;
    an organic layer disposed on the first color filter and the second color filter, the organic layer comprising a first protruding portion overlapping with the insulating layer;
    a first pixel electrode disposed on the organic layer in the first pixel area, the first pixel electrode being electrically connected to the first switching element;
    a second pixel electrode disposed on the organic layer in the second pixel area, the second pixel electrode being electrically connected to the second switching element;
    wherein:
    the organic layer further comprises a portion overlapping with the second switching element;
    a first height measured from the surface of the first base to an upper surface of the first protruding portion is greater than a second height measured from the surface of the first base to an upper surface of the portion of the organic layer; and
    a height difference between the first height and the second height is 0.3 μm to 0.5 μm.

9. The display device of claim 8, further comprising:
    a first organic insulating pattern disposed on the organic layer and overlapping with the first protruding portion,
    a second organic insulating pattern disposed on the organic layer and overlapping with the second color filter.

10. The display device of claim 9, wherein the first organic insulating pattern and the second organic insulating pattern have the same height.

11. The display device of claim 8, wherein the first protruding portion overlaps the first color filter.

* * * * *